United States Patent
Chen et al.

(10) Patent No.: US 10,360,532 B2
(45) Date of Patent: Jul. 23, 2019

(54) METHOD AND SYSTEM FOR ESTIMATING STOCK LEVEL OF SHELF

(71) Applicant: WISTRON NEWEB CORPORATION, Hsinchu (TW)

(72) Inventors: Wei-Hong Chen, Hsinchu (TW); Yu-Sen Wu, Hsinchu (TW); Po-Ching Wu, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 183 days.

(21) Appl. No.: 15/582,083

(22) Filed: Apr. 28, 2017

(65) Prior Publication Data

US 2018/0089613 A1   Mar. 29, 2018

(30) Foreign Application Priority Data

Sep. 23, 2016 (TW) .............................. 105130822 A

(51) Int. Cl.
| | |
|---|---|
| *G06Q 10/00* | (2012.01) |
| *G06Q 10/08* | (2012.01) |
| *G06T 7/11* | (2017.01) |
| *G06T 7/90* | (2017.01) |
| *G02B 5/20* | (2006.01) |
| *G06T 7/00* | (2017.01) |
| *G06T 7/62* | (2017.01) |

(52) U.S. Cl.
CPC .......... *G06Q 10/087* (2013.01); *G02B 5/208* (2013.01); *G06T 7/001* (2013.01); *G06T 7/0008* (2013.01); *G06T 7/11* (2017.01); *G06T 7/62* (2017.01); *G06T 7/90* (2017.01); *G06T 2207/10024* (2013.01); *G06T 2207/10048* (2013.01); *G06T 2207/20021* (2013.01); *G06T 2207/30242* (2013.01)

(58) Field of Classification Search
CPC ......... G06K 9/00; G06Q 10/00; G06Q 10/087
USPC ............................................. 382/165; 705/28
See application file for complete search history.

(56) References Cited

U.S. PATENT DOCUMENTS

| | | | |
|---|---|---|---|
| 8,577,136 B1 * | 11/2013 | Ascher ................. | G06Q 10/087 382/165 |
| 9,015,072 B2 * | 4/2015 | Wu ...................... | G06Q 10/087 705/28 |
| 9,367,770 B2 * | 6/2016 | Footen .................... | G06K 9/78 |
| 9,424,482 B2 * | 8/2016 | Patel .................. | G06F 17/30247 |
| 9,483,704 B2 * | 11/2016 | Schwartz ............ | G06K 9/00201 |

(Continued)

*Primary Examiner* — Oluseye Iwarere
(74) *Attorney, Agent, or Firm* — Li & Cai Intellectual Property (USA) Office

(57) ABSTRACT

The disclosure is related to a method and a system for estimating a stock level of a shelf. An image processing technique is incorporated to conduct stock estimation that is used as a reference for replenishment decisions. In the method, a camera is used to capture a shelf image. The shelf image is divided into multiple sub-region images. Multiple binarized images with respect to the multiple sub-region images are obtained by applying a binarization method. A ratio of the binarization values with respect to the pixels within every sub-region is calculated. The method also includes comparing the ratio of the binarization values in at least two sub-regions with a reference ratio in the at least two sub-regions within a shelf reference image. The comparison is used to estimate the stock level, and also to determine whether the shelf is to be replenished.

19 Claims, 8 Drawing Sheets

(56) References Cited

U.S. PATENT DOCUMENTS

| | | | | |
|---|---|---|---|---|
| 9,514,382 B2* | 12/2016 | Ishihara | .................... | G06K 9/48 |
| 9,536,167 B2* | 1/2017 | Schwartz | ........... | G06K 9/00201 |
| 9,697,429 B2* | 7/2017 | Patel | ................. | G06F 17/30247 |
| 9,710,926 B2* | 7/2017 | Zhang | ................ | G06K 9/00771 |
| 9,811,754 B2* | 11/2017 | Schwartz | ........... | G06K 9/00201 |
| 9,971,939 B2* | 5/2018 | Sawada | ............. | G06K 9/00624 |
| 10,078,878 B2* | 9/2018 | Bai | ......................... | G06T 1/005 |
| 2015/0063651 A1* | 3/2015 | Ishihara | .................... | G06K 9/48 |
| | | | | 382/110 |
| 2015/0117788 A1* | 4/2015 | Patel | ................. | G06F 17/30247 |
| | | | | 382/199 |
| 2016/0171336 A1* | 6/2016 | Schwartz | ........... | G06K 9/00201 |
| | | | | 382/173 |
| 2016/0171429 A1* | 6/2016 | Schwartz | ........... | G06K 9/00201 |
| | | | | 382/103 |
| 2016/0171707 A1* | 6/2016 | Schwartz | ........... | G06K 9/00201 |
| | | | | 382/180 |
| 2016/0224857 A1* | 8/2016 | Zhang | ................ | G06K 9/00771 |
| 2016/0328618 A1* | 11/2016 | Patel | ................. | G06F 17/30247 |
| 2016/0379052 A1* | 12/2016 | Sawada | ............. | G06K 9/00624 |
| | | | | 348/159 |

* cited by examiner

METHOD AND SYSTEM FOR ESTIMATING STOCK LEVEL OF SHELF

BACKGROUND OF THE INVENTION

1. Field of the Invention

The present invention is generally related to a technique for estimating a stock level of a shelf, in particular to a method and a system for estimating the stock level of the shelf according to pixel information of an image of the shelf.

2. Description of Related Art

In general, the items on a shelf at a conventional shop require replenishment only if a clerk of the shop actively discovers that insufficient items are on the shelf. It is not only a waste of manpower, but could also result in obstructing sale of items due to human negligence.

Although there are known technologies capable of estimating a stock volume based on the information of purchase and shipment of goods, the technologies are mostly applied to warehouse management, but are not widely used for stores in general. The known technologies cannot be applied for determining actual status of remaining on-shelf items.

In consideration of cost and demand, the conventional technologies fail to provide an efficient and low-cost solution for estimation of a stock level. At present, information on shelf inventory still relies on customer feedback or stock-taking by clerks.

SUMMARY OF THE INVENTION

For providing a solution capable of efficiently and instantly obtaining the status of the stock level of a shelf, a method and a system for estimating the stock level of the shelf in accordance with the present invention are disclosed. However, this technique is different from conventional automatic management systems for warehouses because the object of the invention is to estimate the stock level of the shelf in real time based on the actual situation.

In one aspect of the present invention, the method for estimating the stock level of the shelf includes capturing a shelf image. The shelf image is then separated into multiple sub-region images. A binarization computation is then performed on the shelf image so as to obtain a binarized image of each sub-region. The binarized image includes a first value and a second value, respectively indicative of a block black pixel and a white pixel. A binarization value ratio is the ratio of pixels having the first value or the second value among the pixels in a sub-region can be calculated, and a binarization reference ratio among the pixels in the sub-region based on the shelf reference image can also be calculated. Further, a ratio difference between the binarization value ratios and the binarization reference ratios for at least two sub-region is therefore obtainable. This ratio difference is referred to obtain a stock decision parameter which is used to estimate a stock level.

In one embodiment of the present invention, the binarization value ratio derived from part or all of the sub-regions is used to obtain a stock parameter. Further, the binarization reference ratio derived from part or all of the sub-regions is used to obtain a reference parameter. A relationship between the stock parameter and the reference parameter can be used to produce the stock decision parameter.

In an aspect of the system for estimating the stock level of the shelf in accordance with the present invention, the system employs a circuitry in cooperation with a set of computation modules to implement estimation of the stock level of the shelf. The system includes a control unit in charge of controlling the circuit units that are electrically connected with the control unit. The circuit units in the system essentially include an image capture unit used to capture a shelf image, a memory unit used to store the images, and a computation module used to perform the method for estimating the stock level of the shelf. For example, a set of instructions are stored in the memory unit, and executed by one or more processors in the system for performing the method.

The system includes one or more light-source units that are disposed on the shelf. When the light-source unit is activated, a shelf image is captured by a camera. If there is another light-source unit, e.g. a second light-source unit, second shelf image with another angle of light can be captured. A binarization computation is performed on the second shelf image, and auxiliary binarization value ratio for the sub-region from another angle of light can be obtained. The auxiliary binarization value ratio is compared with the auxiliary binarization reference ratio, another ratio difference is thereby calculated. This ratio difference acts as auxiliary information for rendering the stock decision parameter.

In an embodiment of the present invention, the light-source unit may adopt an infrared light source whose wavelength is ranged from 700 nm to 940 nm. The system further includes a communication unit for linking to a stock management system. The stock management system is able to collect a plurality of stock levels from multiple shelves after the estimation of shelf stock.

DETAILED DESCRIPTION OF THE PREFERRED EMBODIMENTS

The present invention will now be more fully described hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The disclosure is related to a method and a system for estimating the stock level of a shelf in accordance with the present invention. An image processing technology is incorporated to efficiently estimate an instant stock level of a shelf at a tangible mall or a shop. The estimation of a stock level allows an operator of the shop to judge whether or not the items on the shelf are to be replenished.

In the system for estimating the stock level of a shelf, a camera unit is incorporated to capture a shelf image under a light with a specific spectrum. A light-source unit is adopted in the system, and the light-source unit may be an infrared light source that emits an infrared light in a wavelength range of 700 nm to 940 nm. This kind of light source rather than a general light source can avoid interference from an ambient light. Therefore, the light-source unit, e.g. the infrared light source, increases credibility of the estimation of stock level. The image processing technology allows the system to actively detect the stock level of the shelf. For example, the system can be applied to estimating the stock level of goods in the store or mall. The proprietor can be informed of the instant stock level on every shelf via a communication protocol. Therefore, the proprietor or the supplier can effectively prevent unnecessary checking and save costs associated with replenishment by keeping the goods supplier informed for timely and/or scheduled replenishments.

Figure 1:
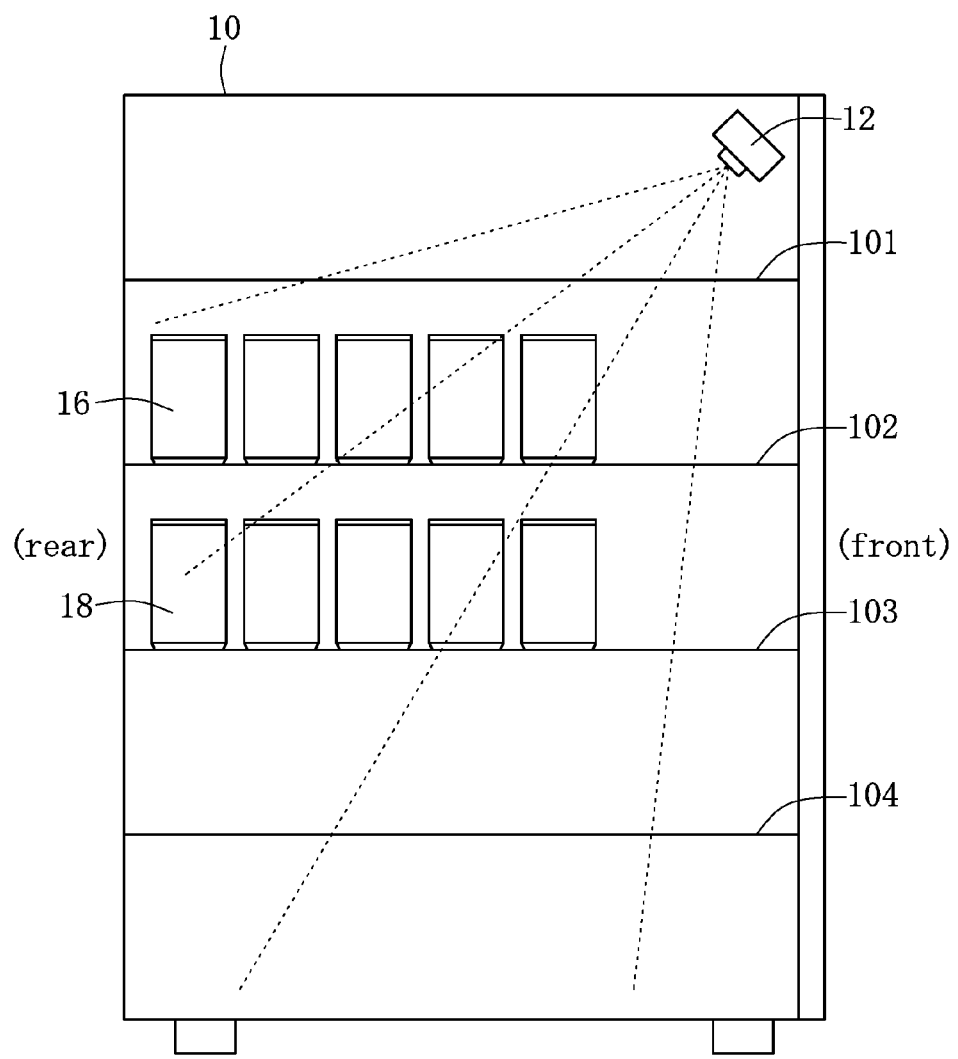
FIG. 1 shows a schematic diagram depicting the system for estimating the stock level of a shelf in one embodiment of the present invention.

Reference is made to FIG. 1, which shows a schematic diagram depicting a system for estimating the stock level of a shelf in accordance with the present invention. This diagram shows a multi-layer shelf according to one of the embodiments of the present invention, but the diagram is not to limit the scope of the invention.

The multi-layer shelf 10 is partitioned by multiple partitions 101, 102, 103 and 104. On the shelf, a camera unit 12 is mounted at the top of the shelf 10 and used to capture a shelf image of the multi-layer shelf 10 at a specific angle. The shelf image covers multiple partitions of the shelf 10. In an exemplary example, the camera unit 12 is used to capture an image of items 16 and 18 in stock placed on the shelf 10. Preferably, the camera unit 12 can be optimized at a specific angle so that the captured shelf image covers the rear of the shelf 10. This is because the items 16 and 18 are generally placed from the rear of the shelf 10 to the front of the shelf 10.

The camera unit 12 is able to operate full time, at regular intervals, or by being triggered to take a picture under specific conditions. For example, every time the door of the shelf 10 is closed, the camera unit 12 could be triggered to take one picture of the shelf 10. The shelf image can be processed by an image processing method, and compared with a reference shelf image for estimating the stock level of the shelf 10.

In one further embodiment, for the purpose of capturing shelf images which cover more layers of on the shelf, the partitions 101, 102, 103 and 104 can be made by transparent or light-permeable materials. In an exemplary example, the partitions may be perforated. The reference shelf image may be a picture taken when on the shelf 10 is empty of items. The reference shelf image acts as a basis for comparison with the shelf image with the items 16 and 18 in stock. An image difference therebetween is referred to for estimating the stock level.

According to the present application, the camera unit 12 operates independently under a general light source, e.g. a light source disposed inside the shelf. A shelf image of the shelf 10 with stored items is captured. The shelf image, after image processing, is then compared with the aforesaid reference shelf image for conducting the estimation of the stock level.

Figure 2:
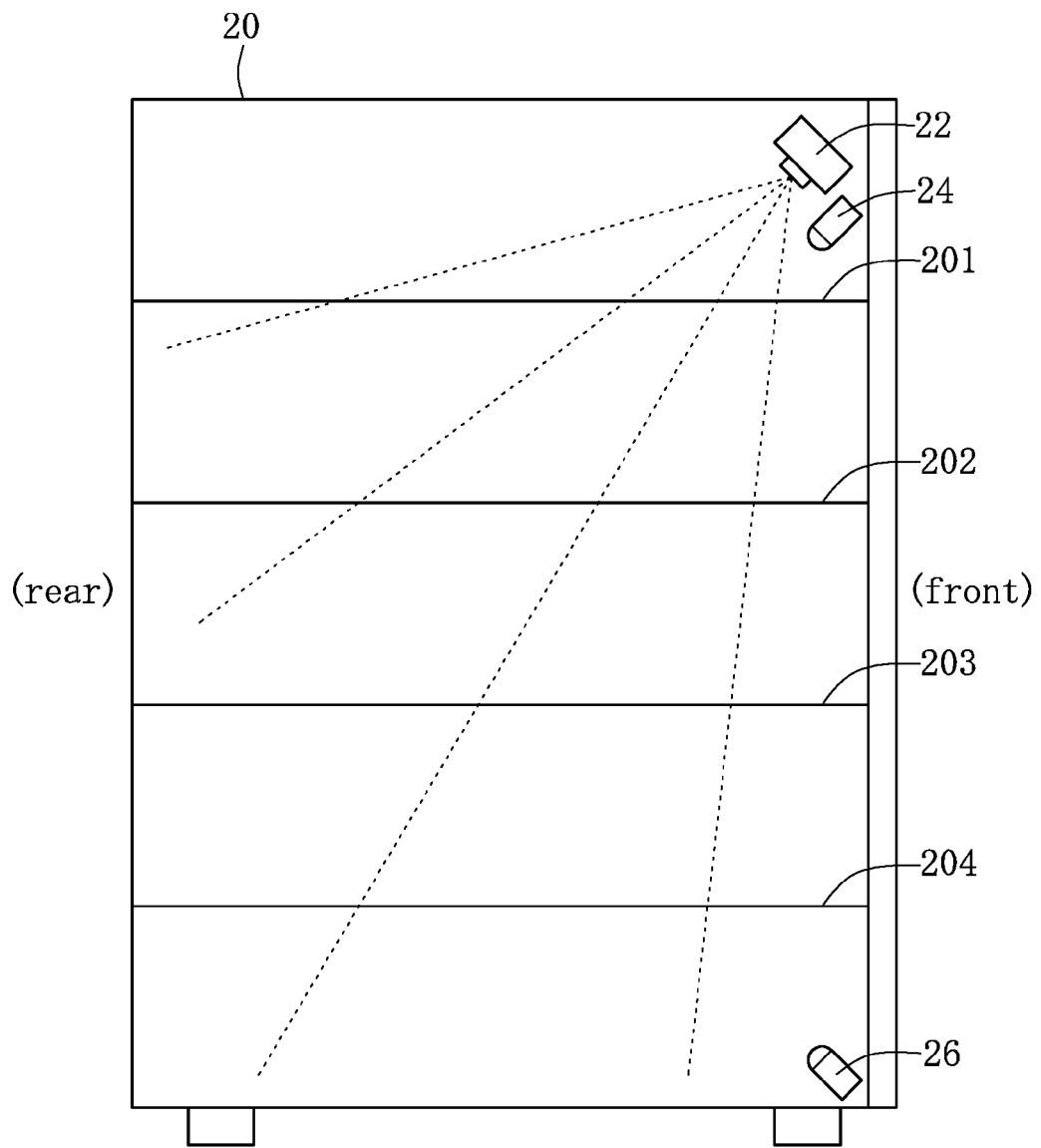
FIG. 2 shows another schematic diagram of the system in another embodiment of the present invention.

FIG. 2 shows a schematic diagram showing another embodiment of the present invention, in which a shelf 20 is described. The shelf 20 includes a plurality of partitions 201, 202, 203 and 204. A camera unit 22 is mounted at a top of the shelf 20, and a first light-source unit 24 is disposed at the same side as that of the camera unit 22. Yet another embodiment is shown in the diagram, indicated by a second light-source unit 26 disposed at the bottom side of the camera unit 22, e.g. below the camera unit 22.

In operation, the first light-source unit 24 emits a top-down light on the shelf 20, and the camera unit 22 captures a top-down image of the shelf 20. Therefore, a region with items in stock would result in an image with higher gray level value because the items on the shelf 20 are able to reflect the light. Alternatively, the second light-source unit 26 emits a bottom-up light on the shelf 20, and the camera unit 22 capture a top-down image of the shelf 20. However, the region with items in stock would result in an image with lower gray level value because the items on the shelf 20 interrupt the bottom-up light.

Further, the abovementioned first light-source unit 24 and second light-source unit 26 may emit an invisible light, a laser, a monochromatic light, or even two or more types of the light sources. It is preferable that the chosen light source operates with a corresponding camera unit 22 that can effectively exclude interference caused by a normal light or an ambient light for enhancing the accuracy of the estimation.

Figure 3A:
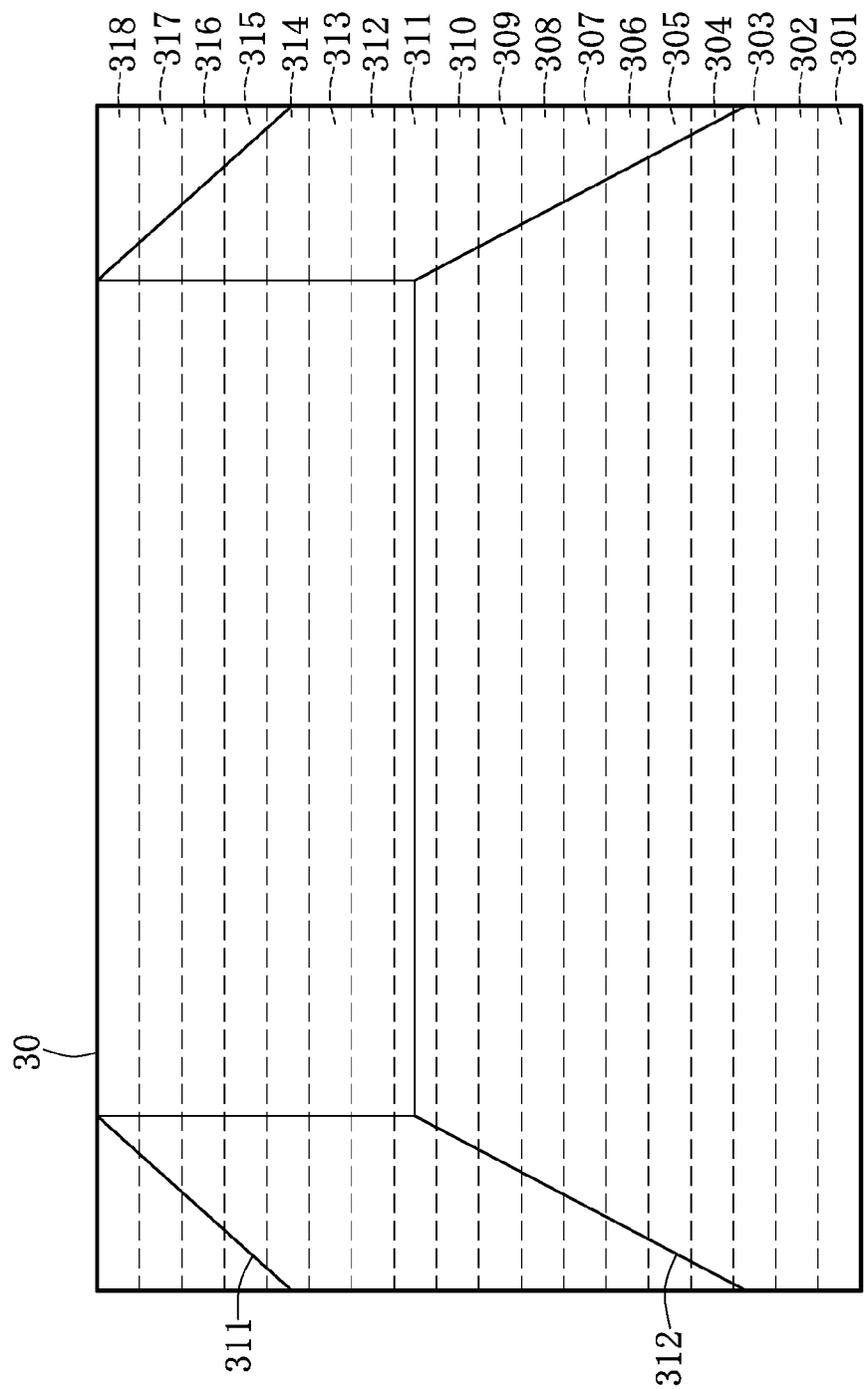
FIGS. 3A through 3C show a series of diagrams describing operations in the method for estimating the stock level of the shelf in accordance with the present invention.
Figure 3B:
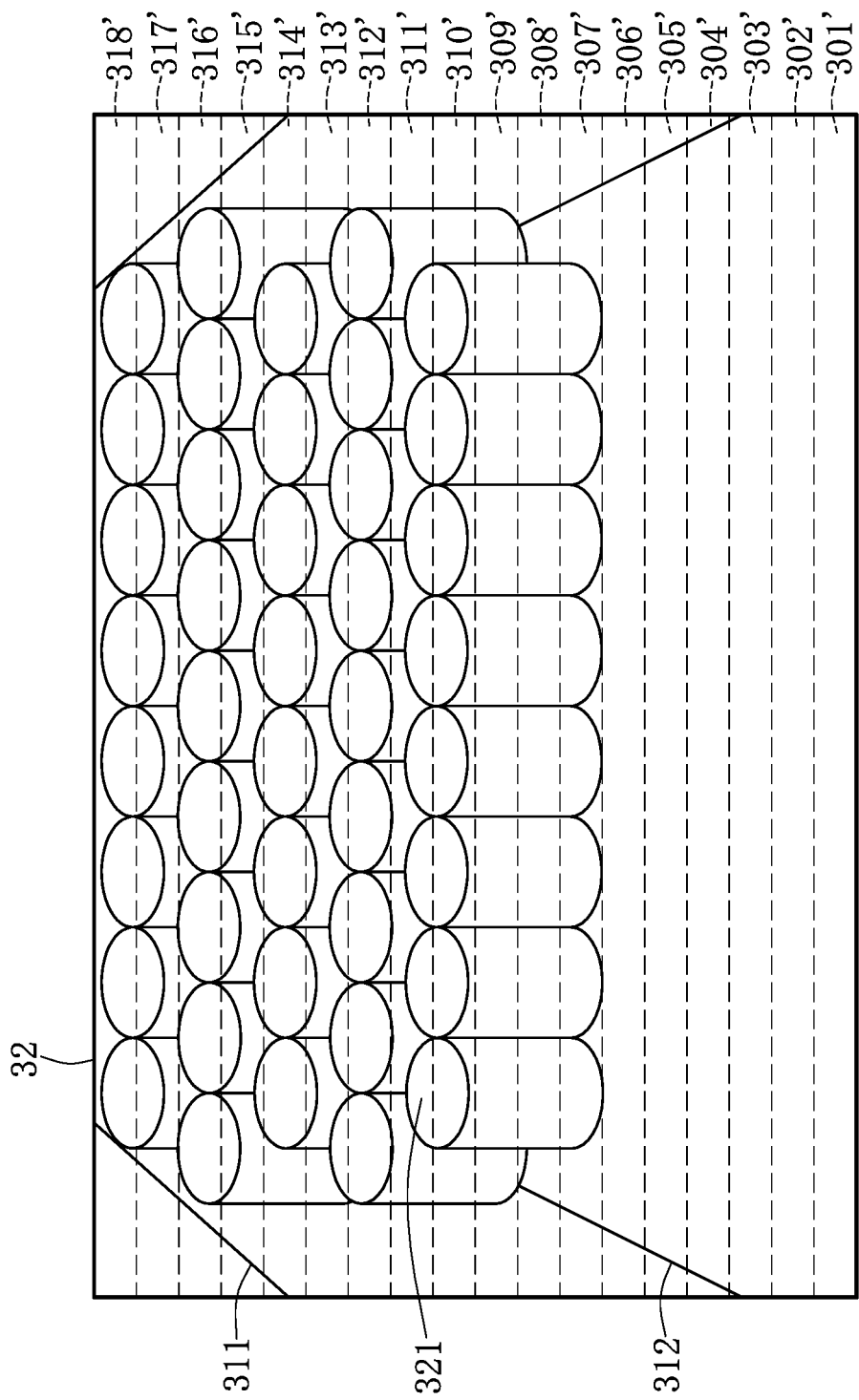
Figure 3C:
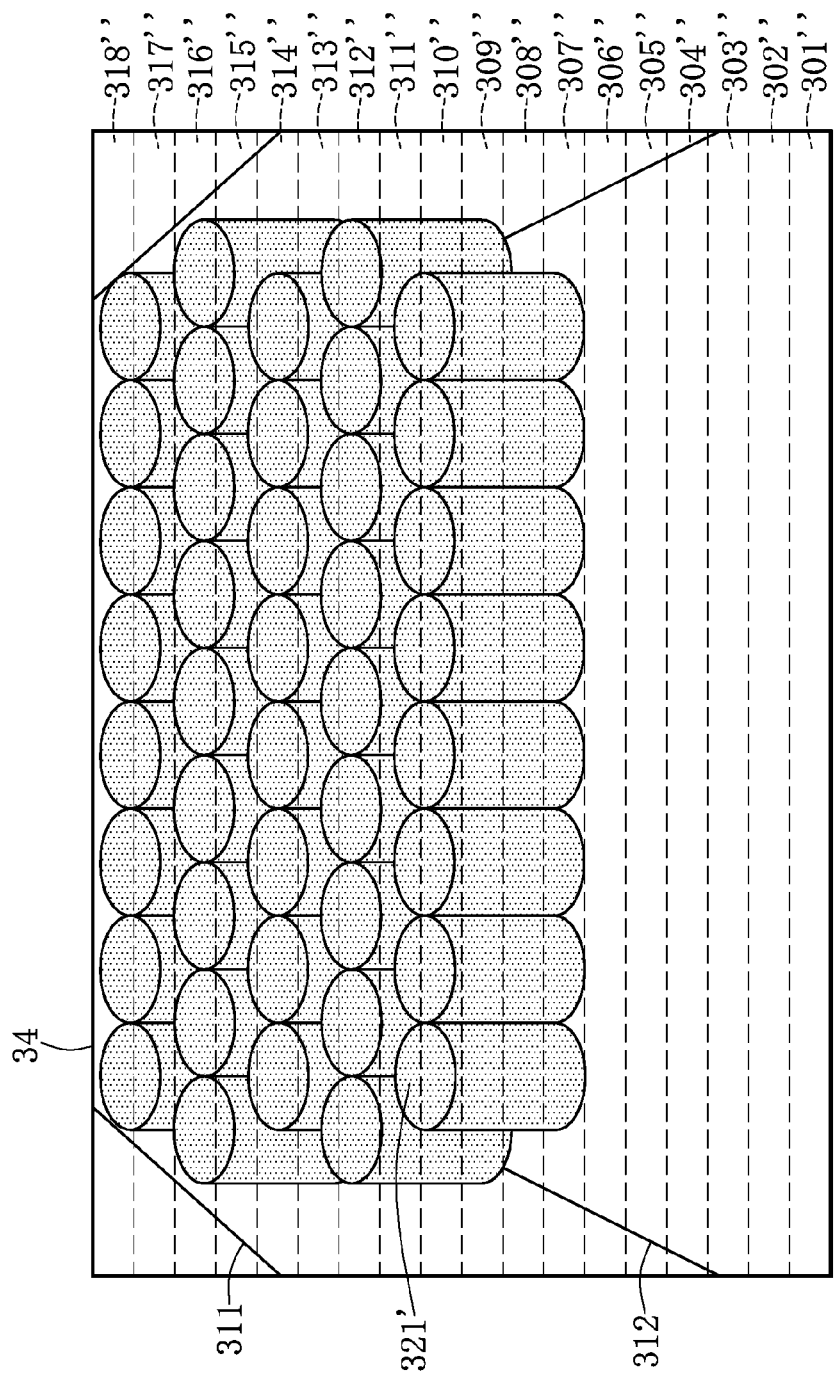

FIGS. 3A to 3C schematically show an embodiment which describes the method for estimating the stock level of a shelf.

In FIG. 3A, a camera unit, e.g. the camera unit 22 of FIG. 2 in cooperation with the first light-source unit 24, is used to capture a reference shelf image 30. The reference shelf image 30 is preferably an image of the shelf with no items in stock. The reference shelf image 30 acts as a reference for estimating the stock level of the shelf. The reference shelf image 30 is preferably an image taken from an empty shelf. The schematic diagram shows the reference shelf image 30 covering a shelf with a space partitioned by a first partition 311 (the top one) and a second partition 312 (the bottom one). On the contrary, FIG. 3B schematically shows a shelf image 32 of the shelf filled up with items in stock.

To operate the method for estimating the stock level of a shelf, the shelf image showing a distribution of stock can be divided into multiple sub-regions. In an exemplary example, the reference shelf image 30 of FIG. 3A is divided into multiple sub-regions 301 to 318 that are separated by dashed lines. The shelf image 32 of FIG. 3B is divided into multiple sub-regions 301' to 318'. It should be noted that the number of the sub-regions of the reference shelf image 30 is the same as the number of sub-regions of the shelf image 32.

The sub-regions 301 to 318/301' to 318' of the reference shelf image/shelf image are multiple parallel strip areas in one image. However, the type of sub-regions may not exclude other types of sub-regions. The shelf image can be separated into multiple small squares in an array, or multiple longitudinal strip areas. No matter what the type of the sub-regions is applied to, the main purpose of the sub-regions is to obtain an image distribution of the items in stock.

FIG. 3B schematically shows a stock image 321 with items on the shelf. It is apparent that the image feature of the shelf image 32 of FIG. 3B is different from the image feature of the reference shelf image 30 of FIG. 3A. In the method, the shelf image 32 under an image processing method is compared with the reference shelf image 30 so as to determine the status of stock on the shelf. Once compared with a sample model, a stock level can be estimated.

Relative to the diagram of FIG. 3B, FIG. 3C shows another diagram depicting a shelf image under a light from another angle. The camera unit 22 of FIG. 2 can be used to capture a shelf image 34 of the shelf under the light emitted by the second light-source unit 26. The shelf image 34 has a relatively darker stock image 321' since the light source is at a position opposite to the camera unit 22. Therefore, as compared with the stock image 321 of FIG. 3B, the stock image 321' of FIG. 3C is relatively darker.

Figure 4:
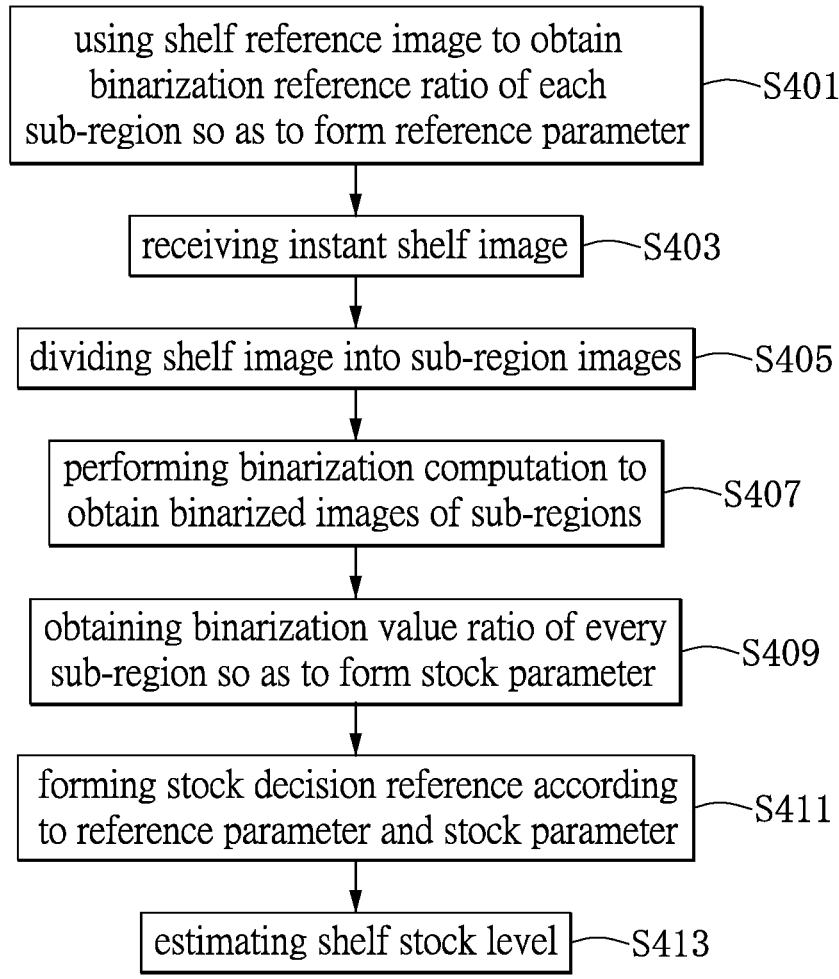
FIG. 4 shows a flow chart depicting the process of estimating the stock level of the shelf in one embodiment of the present invention.

Accordingly, the system captures the reference shelf image 30 of FIG. 3A, the shelf image 321 of FIG. 3B, and another shelf image 321' of FIG. 3C. In the method, the information from those images is utilized to perform the method for estimating the stock level of the shelf. FIG. 4 describes the process of the method. It is noted that the order of the steps in the flow chart is not intended to limit the scope of the invention.

As shown in step S401, the system can first establish a reference parameter for the purpose of estimating the stock level. The reference parameter can be acquired from a shelf reference image, e.g. the shelf image 30 of the empty shelf of FIG. 3A. The reference parameter can be a fixed value stored in the system.

In an exemplary example, one of the methods for computing the reference parameter includes dividing the shelf reference image into multiple sub-regions, e.g. the sub-regions 301 to 318 of FIG. 3A. Then, the reference parameter is established according to the pixel characteristics in each sub-region. In which, the pixels in each region of the sub-regions 301 to 318 are under a binarization computation for acquiring a binarized image of each sub-region. Finally, a ratio among the pixels with values of binarization is referred to form the reference parameter.

The binarization computation performed upon the images is able to identify whether the region(s) with items in stock or the region(s) without items in stock effectively. In general, the binarization is one of the methods to divide the image into two extreme values. The pixel in each sub-region image has a gray value. While compared with a gray threshold, the greater gray value is set to a first value and the lesser gray value is set to a second value. The pixel having the first value may be a white pixel, and the pixel having the second value may be a black pixel. A quantitative relationship between the number of the pixels having the first value and the number of the pixels having the second value forms a ratio of the white pixels or the black pixels to a number of total pixels. The ratio defines a binarization reference ratio acting as a reference parameter. The reference parameter is referred to estimate the stock level of the shelf, and determine whether or not the shelf should be replenished.

To establish the reference parameter, the system receives a shelf image taken by a camera unit with a specific light source, as shown in step S403. The shelf image, e.g. shelf image 32 of FIG. 3B, of the shelf having at least one layer is captured in real time. An infrared acts as the light source that irradiates the shelf, and the camera unit captures the shelf image. In step S405, the shelf image can be divided into multiple sub-region images, such as the sub-regions 301' to 318' shown in FIG. 3B, or the sub-regions 301" to 318" of FIG. 3C.

Next, in step S407, a binarization computation is performed on the sub-regions 301' to 318' so as to obtain a plurality of binarized images of the sub-regions. The pixels of each sub-region are divided into the pixels having a first value and the pixels having a second value. A quantitative relationship between the pixels with the first value and the second value can be obtained. In an example, this quantitative relationship can derive a ratio of the number of pixels having the first value and the number of pixels having the second value to the number of the total pixels. The ratio is such as a binarization value ratio for every sub-region, as shown in step S409, the binarization value ratio forms a stock parameter. It is noted that the stock parameter and the reference parameter may be based not only on the binarization value ratio of all continuous sub-regions, but may also be optionally based on the binarization value ratio of part of the sub-regions.

In an exemplary example, the sub-regions have at least a continuous or discontinuous first sub-region, second sub-region, and $n^{th}$ sub-region. A first binarization value ratio for the first sub-region, a second binarization value ratio for the second sub-region, and $n^{th}$ binarization value ratio for the $n^{th}$ sub-region are calculated. Similarly, according to a shelf reference image, one binarization reference ratio of every sub-region can be computed, so that a first binarization reference ratio for the first sub-region, a second binarization reference ratio for the second sub-region, and sequentially an $n^{th}$ binarization reference ratio for the $n^{th}$ sub-region can be obtained.

The system then calculates a ratio difference between the binarization value ratio and the binarization reference ratio for every sub-region. This ratio difference forms a stock decision parameter, as shown in step S411. The system obtains a stock decision parameter according to the reference parameter and the stock parameter. It is noted that the reference parameter is formed by the binarization reference ratio of part or all of the sub-regions; and the stock parameter is formed by the binarization value ratio of part or all of the sub-regions. In one embodiment, while a ratio difference for every sub-region is calculated, and the ratio differences from part or all of the sub-regions can be utilized to obtain the stock decision parameter that is used to estimate a stock level of the shelf, such as step S413.

According to the above embodiment, in the step of calculating the ratio difference for the sub-region, a first difference between a first binarization value ratio and a first binarization reference ratio of a first sub-region can be calculated. The first difference renders a first stock decision parameter. Similarly, a second difference between a second binarization value ratio and a second binarization reference ratio of a second sub-region can also be calculated. The second difference renders a second stock decision parameter. An $n^{th}$ stock decision parameter for an $n^{th}$ sub-region can be obtained. Finally, the stock level is estimated at least based on the first stock decision parameter and the second stock decision parameter of the continuous or discontinuous sub-regions.

Through the binarization process, a ratio of the number of the first value or the number of the second value to total pixel number of every sub-region of the shelf image can be obtained. The relationship between the ratio for the shelf image and the other ratio for the shelf reference image renders the stock decision parameter.

Figure 6A:
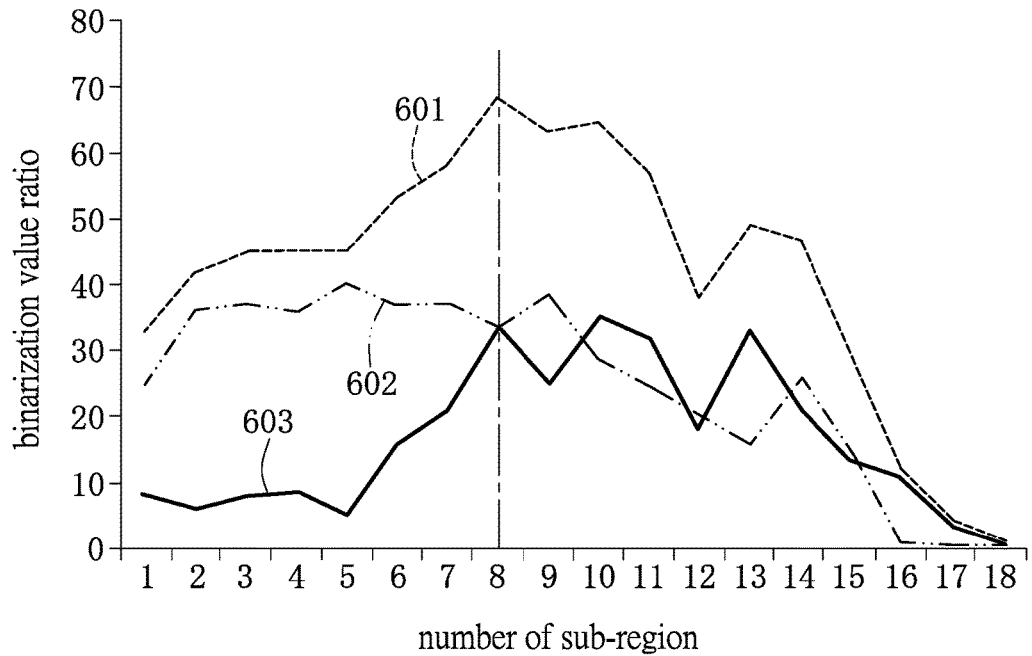
FIGS. 6A through 6B show an exemplary curve diagram of a decision curve generated by the method according to one embodiment of the present invention.
Figure 6B:
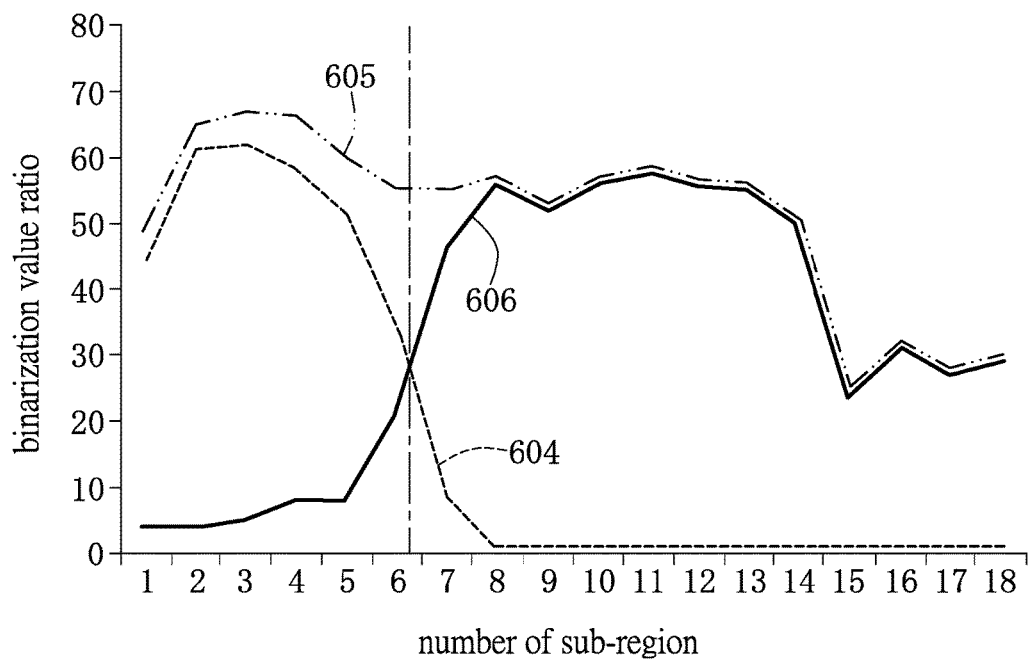

FIGS. 6A to 6B show the schematic diagrams depicting the decision curves generated by the method for estimating the stock level of the shelf in accordance with the present invention.

In FIG. 6A, in view of the embodiments shown in FIG. 2, the curves illustrated in the diagram are generated based on a shelf image taken with a light source at the top of the shelf. A horizontal axis in the graph shows numerals 1 to 18 indicative of a series of continuous sub-regions. Further, a vertical axis in the graph indicates the value of ratio of the number of first value or the second value of the binarized pixels to the number of the total pixels for each sub-region. The curves of the graph exemplarily show three ratios of the binarized pixels of the sub-regions (numbers 1 to 18) in situations described in FIGS. 3A to 3C.

For example, the stock curve 601 indicates a ratio of the number of the first value or the second value to the total pixel number of every sub-region of the shelf image. The stock curve 601 denotes an image feature that reflects the items in stock. In the present example, the stock curve 601 has a larger slope around the sub-regions no. 5 to no. 8. It is therefore estimated that the items in stock are mostly distributed over these sub-regions.

Because light travel on the shelf can be affected by the articles or partitions of the shelf, the light paths on the shelf are different due to the variant shelves. Therefore, the image features captured by the camera unit are different. Due to this outcome, the system in accordance with the present invention is required to create a reference image for every individual shelf. The reference curve 602 indicates a binarization reference ratio that is exemplarily responsive to a reference shelf image covering multiple continuous sub-regions with respect to a specific shelf. A decision curve 603 can be generated from a stock curve 601 compared to this reference curve 602. For example, according to one embodiment, the decision curve 603 is an absolute value that is derived from the reference curve 602 being subtracted from the stock curve 601. Alternatively, the decision curve 603 can also be an absolute value that is obtained from the stock curve 601 being subtracted from the reference curve 602. The decision curve 603 acts as a curve to estimate the stock level in response to the shelf image and the reference shelf image.

In the present example, a curve segment around the sub-regions numbered 1 to 5 shows a mild change and lower ratio over the decision curve 603, and another segment around the sub-regions numbered 5 to 8 has a sudden increased change in the slope. In view of the diagram shown in FIG. 3B, it is determined that the items in stock starts from the sub-region numbered 5. Further, the decision curve 603 shows that the binarization value ratios within the sub-regions with the larger numbers, e.g. in the rear region, have no obvious changes. One of the reasons causing the gentle changes over the decision curve 603 in the region with larger numbers may be that the light has difficulty reaching the rear sub-regions of the shelf, or is restricted by the shelf structure. The mentioned gentle changes of the rear regions over the decision curve 603 may not act as the reference to make any decision. However, the system in accordance with the present invention can still utilize the decision curve 603 within the front sub-regions of the shelf to conduct the estimation of the stock level.

FIG. 6B shows another decision curve in an exemplary example. In view of the system schematically shown in FIG. 2, the curves shown in FIG. 6B represent binarization value ratios generated from the shelf image with a bottom light source on the shelf. The related shelf image with the bottom light source may also be referred to the image shown in FIG. 3C. It is noted that the graph of binarization value ratios with respect to the sub-regions 301" to 318" with the bottom light source are different from the graph with the top light source.

Under the same coordinates, the stock curve 604 represents the features of the binarized shelf image with certain items in stock. The stock curve 604 is characterized in that the front sub-regions numbered 1 to 5 have larger ratio values, and the ratio values gradually fall to around zero in the back-end sub-regions since, according to the current embodiment, the binarization value ratio indicates the ratio of the white pixels accounting for total pixels of each sub-region. It is apparent that the placement of the items in stock result in the changes over the stock curve 604. On the contrary, a reference curve 605 shows the more gentle changes.

A decision curve 606 is an absolute value of the reference curve 605 being subtracted from the stock curve 604, or the absolute value of the stock curve 604 being subtracted from the reference curve 605. The decision curve 606 reflects a difference between the binarization value ratios of the shelf image with the items and the reference image. Therefore, the changes over the decision curve 606 act as the reference to estimate the stock level of the shelf. The decision curve 606 in the present example shows the sub-regions numbered 1 to 5 with lower ratio values, and the regions starting at the sub-region numbered 6 with obvious changes of slope. The starting point that the items were placed on the shelf can be estimated by referring to the items starting from the sub-region 306 in the shelf image shown in FIG. 3C.

The arithmetic statement below describes the process to estimate the stock level of the shelf according to a decision curve.

The shelf reference image is first divided into multiple sub-regions. A binarization computation is performed to the images with respect to the sub-regions for calculating a first value or a second value for every pixel of the sub-regions. A ratio of the number of pixels having the first value or the number of pixels having the second value to a total pixel number can be calculated. In an equation for the calculation, "E[i]" denotes a binarization reference ratio. The sub-regions are numbered with "i=1~n", in which "n" denotes a number of the sub-regions. The above-mentioned reference curves (602, 605) can be described by "E[i]".

An instantly-captured shelf image is divided into multiple sub-regions. The pixels of the sub-regions are under a binarization computation for obtaining a ratio of the number of pixels having the first value or the number of pixels having the second value to a number of pixels in each sub-region of the shelf image. "M[i]" denotes a binarization value ratio. The sub-regions are numbered with "i=1~n", in which "n" denotes a number of the sub-regions. "M[i]" describes the above-mentioned stock curves (601, 604).

Next, a stock decision parameter "DC[i]" is an absolute value of a subtraction of the binarization value ratio "M[i]" from the binarization reference ratio "E[i]". This equation is expressed by "DC[i]=ABS(M[i]−E[i])", in which "ABS( )" is a function of absolute value. The sub-regions are numbered "i=1~n", in which "n" denotes a number of the sub-regions. "DC[i]" describes the mentioned decision curves (603, 606).

For determining the placement of the items on the shelf, namely a starting point over the decision curve, a decision threshold is introduced to compare with two adjacent stock decision parameters, e.g. the numerical values "DC[i]" and "DC[i−1]". A difference variation between the first stock decision parameter and the second stock decision parameter is calculated. The change in the slope of the curve shows the difference variation. After that, if the difference variation between the two stock decision parameters is larger than the decision threshold, a corresponding sub-region can be determined, and its number denotes the starting point of placement of the items in stock. This indicates that a corresponding sub-region numbered "i"=Th should be determined as the starting point of placement of the items in stock when the value/absolute value of "DC[i]−DC[i−1]" is larger than the decision threshold. In one further embodiment, the stock decision parameters with respect to two non-adjacent sub-regions, e.g. DC[i], DC[i−2], can also be used to determine the starting point of placement of the items on the shelf. For example, the starting point can be found when "DC[i]−DC[i−2]" is larger than the decision threshold.

The following arithmetic statement describes the process to estimate the stock level of a shelf.

After the starting point, e.g. the sub-region "i"=Th, of placement of the items in stock is determined, the starting point is referred to calculate a ratio of the sub-regions with the items on the shelf to the whole sub-regions, e.g. "(n−Th)/n", so as to estimate a stock level of the shelf. Referring to FIG. 6A, the sub-regions numbered 5 to 8 over the stock curve 601 meet a larger slope, and the slope around the sub-region numbered 6 is larger than the decision threshold, e.g. Th=6. Since the total number of sub-regions is eighteen, it is estimated that the items in stock occupy 66%, e.g. (18−6)/18=66%, of the shelf, showing that a stock level of the shelf is 66%.

Next, an inventory threshold is introduced. When the ratio of the sub-regions with the items to the total sub-regions is lower than the inventory threshold, a notice of replenishment will be issued. For example, if the inventory threshold is 30%, the notice of replenishment is generated for the proprietor when the system determines that the stock level is lower than 30%.

In one embodiment, the system may also obtain several shelf images from two light sources with two different angles at the same time. The two (or more) shelf images can be complementary for estimating the stock level. The graphs shown in both FIG. 6A and FIG. 6B are produced from binarized features of the shelf images taken by the camera unit with two different angles of light. The ratios of the number of pixels having the first or second value under the binarization computation in the sub-regions render the decision curves (603, 606). A decision can be made by averaging the values of the decision curves (603, 606), or giving them different weights, and the decision can be used to estimate the stock level.

When another light-source unit is adopted on the shelf, the system can obtain another stock decision parameter from the sub-regions. The shelf image with the another angle of light is under the binarization computation so as to obtain a third binarization value ratio for a third sub-region, and a fourth binarization value ratio for a fourth sub-region. By a control unit of the system, the third and fourth binarization value ratios are respectively compared with a third binarization reference ratio for the third sub-region and a fourth binarization reference ratio for the fourth sub-region from a shelf reference image with the same angle of light. A difference can be obtained by the comparison calculated from the shelf image with the light. In the present example, the differences respectively render a third stock decision parameter and a fourth stock decision parameter. The control unit of the system also conducts the estimation of a stock level of the shelf. For example, the first and second stock decision parameter from the shelf image with the original angle of light are provided to estimate the stock level; similarly, the third stock decision parameter and the fourth stock decision parameter with respect to the continuous or discontinuous sub-regions are also provided to estimate a stock level. It is noted that both the first stock decision parameter and the third stock decision parameter are from the same sub-regions. Similarly, both the second stock decision parameter and the fourth stock decision parameter are also from the same sub-regions. Namely, the first sub-region and the third sub-region are the same, and the second sub-region and the fourth sub-region are the same. Accordingly, the system can adopt an average of the first stock decision parameter and the third stock decision parameter, or give them different weights, to estimate the stock level of the shelf. Similarly, the system can also use an average of the second stock decision parameter and the fourth stock decision parameter, or give them different weights, to estimate the stock level.

Further, according to the above-described embodiments, a shelf image can be obtained by one or more light sources and a camera unit. The system can acquire multiple shelf images with different light sources. Further, the system can continuously obtain multiple shelf images, and perform image processing on the shelf images. After that, the system estimates the stock level based on the multiple shelf images so as to reduce the probability of misjudgement.

Figure 5:
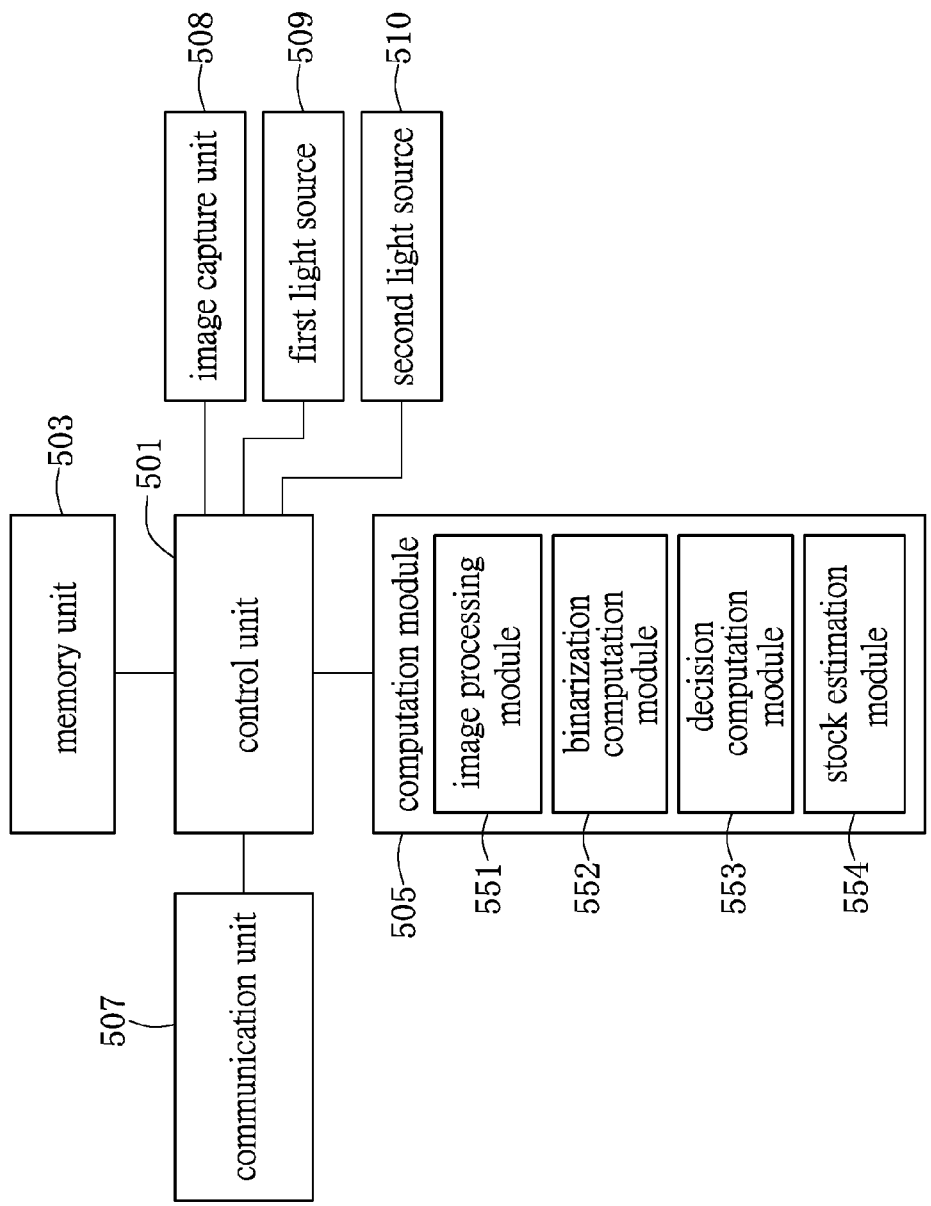
FIG. 5 schematically shows circuit units of the system for estimating the stock level of the shelf in one embodiment of the present invention.

The method for estimating the stock level of a shelf can be implemented in a system installed inside the shelf. The system essentially includes a camera unit, a light-source unit, and a computer system for processing the method. Further, the system may be linked to a cloud service. FIG. 5 shows a diagram of circuit units of the system for estimating the stock level of the shelf. The circuit units can be a system installed inside a device, or a system implemented by multiple devices.

In the system, a camera unit is installed on the shelf. The camera unit includes an image capture unit 508 that has an image sensing element, a bandpass optical filter, and lens. The camera unit is used to capture at least one image of the shelf. The system includes a control unit 501, electrically connected with main units such as an image capture unit 508, a memory unit 503, and a communication unit 507. A computation module 505 includes software program modules implemented by the instructions stored in the memory unit 503. The instructions are executed by the control unit 501 to perform a process of estimating the stock level as described in FIG. 4. The control unit 501 is used to drive an image capture unit 508 to retrieve images, and to drive the memory unit 503 to store the images generated by the image capture unit 508. The memory unit 503 also stores the reference images for later estimation of the stock level, sample models, and the programs requisite to operate the system.

The control unit 501 receives the shelf images. The control unit 501 executes the computation module 505 to perform the process of estimating the stock level of the shelf. The functions provided by the computation module 505 can be separately performed by the functional modules. An image processing module 551 is used to receive a shelf image generated by the image capture unit 508, and to divide the shelf image into multiple sub-regions. A binarization computation module 552 is used to perform a binarization computation to the shelf image. A plurality of binarized images with respect to the sub-regions can be computed. A binarization value ratio for every sub-region is obtained. A decision computation module 553 is used to generate a stock curve in response to the binarization value ratios of the continuous sub-regions of the shelf image, to generate a reference curve based on the reference image, and to generate a decision curve based on the stock curve and the reference curve. A stock estimation module 554 is used to estimate a stock level based on the decision curve, and generate a notice of replenishment based on an inventory threshold.

A system includes one or more light-source units, such as a first light source 509 and a second light source 510. The positions and the number of the light-source units can be adjusted according to altered demands. The light source is preferably an invisible light, e.g. an infrared light or an ultraviolet light, a laser or a monochromatic light, or a combination thereof. For example, the infrared light has a wavelength ranging 700 nm to 940 nm. The light passes through a bandpass filter of the image capture unit 508 with the bandpass ranging between 700 nm and 940 nm. The output images are beneficial to the subsequent image processing process. The light-source units 509 and 510 can be installed on the shelf. The light-source units 509 and 510 can be operated full time, or be activated periodically by the control unit 501. The image capture unit 508 is then driven to capture image of the shelf.

The system further includes a communication unit 507, e.g. an Ethernet network or a mobile network, used to link to an external device. The external device may be a host, an administrator device, or a stock management system at the store or mall, and the device is used to process the instructions for estimating the stock level of the shelf. The stock management system can be a server at a merchandise supplier. The stock management system receives values of stock levels estimated from multiple end systems for estimating the stock on the shelves. The stock management system can manage the stock level on different shelves in a unified manner. The stock management system can receive the instant stock levels from the end shelves. An inventory threshold is introduced. The system issues a notice of replenishment to a proprietor when the stock level received from the proprietor is lower than the inventory threshold.

In an exemplary example, in the method for estimating the stock level of a shelf, every shelf should first establish its unique shelf reference image. The shelf reference image is then divided into multiple sub-regions. Through a binarization computation, the pixels in every sub-region are binarized to be the first value and the second value. A binarization reference ratio for every sub-region can be computed. The binarization reference ratio is then saved to the memory of the system. The system can capture the shelf image instantly. By a binarization computation, the instant shelf image then renders multiple binarized images with respect to multiple sub-regions divided from the shelf image. A binarization value ratio is defined by a ratio of a number of pixels with the first value or the second value to a pixel number in every sub-region.

For example, the pixel having the first value can be a white pixel if the light source is mounted at the top of the shelf. The white pixel denotes the pixel with items in stock. The pixel having the second value is a black pixel that denotes the pixel without items in stock.

On the contrary, FIG. 3B shows the light source mounted at the bottom of the shelf. The pixel with the first value is a black pixel that denotes the pixel with items in stock. The pixel with the second value is a white pixel that denotes the pixel without items in stock, such as the diagram shown in FIG. 3C.

A ratio difference between the binarization value ratio and the binarization reference ratio for every sub-region is computed. The ratio differences for part or all of the sub-regions render the decision curve shown in FIG. 6A or FIG. 6B. The variation of the decision curve is used to determine a stock decision parameter.

Thus, the above embodiments exemplarily describe the method and system for estimating the stock level of a shelf in accordance with the present invention. The method and the system render a solution applied to a shelf for estimating its stock level in real trading. The estimation of stock level is based on image information related to a shelf image, especially the image features in the sub-regions divided from the shelf image. In addition to estimating the stock level of the shelf, the system also allows for comparison of the shelf image with a reference image to aid in replenishment decisions. The system also provides a remote management mechanism for managing the stock on every shelf. The estimated stock levels from the end shelves can be transmitted to a stock management system over a network. The invention solves the problem in conventional technologies, which fail to provide any efficient solution to the management of end shelves in real time, such as providing replenishment notifications.

It is intended that the specification and depicted embodiments be considered exemplary only, with the true scope of the invention being determined by the broad meaning of the following claims.

What is claimed is:

1. A method for estimating stock level of a shelf, comprising:

using a camera unit that is mounted in a shelf to capture a shelf image of a multi-layer shelf at a specific angle;

obtaining the shelf image, being divided into multiple sub-regions;

performing a binarization computation upon the shelf image so as to obtain a binarized image of every sub-region, in which the binarization computation is performed to compare a pixel gray value for each pixel of each of the sub-regions with a gray threshold;

computing a first binarization value ratio for a first sub-region and a second binarization value ratio for a second sub-region, wherein the first sub-region and the second sub-region are among the sub-regions;

obtaining a first binarization reference ratio of the first sub-region and a second binarization reference ratio of the second sub-region based on a shelf reference image that is another shelf image of an empty shelf and is captured by the camera unit;

computing a first difference between the first binarization value ratio and the first binarization reference ratio of the first sub-region, so as to obtain a first stock decision parameter;

computing a second difference between the second binarization value ratio and the second binarization reference ratio of the second sub-region, so as to obtain a second stock decision parameter; and estimating a stock level according to the first stock decision parameter and the second stock decision parameter.

2. The method as recited in claim 1, wherein the pixel with the pixel gray value smaller than the gray threshold is set to a first value, and the pixel with the pixel gray value larger than the gray threshold is set to a second value; and the binarization value ratio or the binarization reference ratio of every sub-region is calculated by dividing the number of the first value or the number of the second value by a pixel number of every sub-region.

3. The method as recited in claim 2, wherein the binarized image of the sub-region is composed of a number of black pixels and white pixels, and the binarization value ratio or the binarization reference ratio indicates a ratio of number of black pixels in the sub-region to the pixel number of the sub-region, or another ratio of number of white pixels in the sub-region to the pixel number of the sub-region.

4. The method as recited in claim 1, wherein the shelf image is obtained by using the camera unit to capture image of the shelf when the shelf is illuminated by an infrared light; and the camera unit includes a bandpass filter whose bandpass range and a wavelength range of the infrared light is 700 nm to 940 nm.

5. The method as recited in claim 1, wherein the multiple sub-regions of the shelf image are multiple parallel strip areas in one image.

6. The method as recited in claim 1, wherein the sub-regions respectively corresponding to the first stock decision parameter and the second stock decision parameter are continuous sub-regions.

7. The method as recite in claim 1, wherein the sub-regions respectively corresponding to the first stock decision parameter and the second stock decision parameter are discontinuous sub-regions.

8. The method as recited in claim 1, wherein the step for estimating the stock level using the stock decision parameters further comprises:
setting a decision threshold;
determining a starting point of items in stock on the shelf by a difference variation between the first stock decision parameter and the second stock decision parameter is larger than the decision threshold;
computing a ratio of the items placed in the sub-regions of the shelf according to the starting point of items in stock, and the ratio is rendered to estimate the stock level.

9. The method as recited in claim 8, further introducing an inventory threshold, a notice of replenishment is generated when the ratio is lower than the inventory threshold.

10. A system for estimating stock level in a shelf, comprising:
an image capture unit used to capture a shelf image;
a control unit, electrically connected to the image capture unit, used to control the image capture unit to capture the shelf image;
a memory unit, electrically connected to the control unit, used to store the shelf image captured by the image capture unit;
an instruction set stored in the memory unit, wherein the instruction set is executed by the control unit to perform a method for estimating stock level on the shelf comprising:
using the image capture unit that is mounted in the shelf to capture the shelf image of a multi-layer shelf at a specific angle;
obtaining the shelf image, being divided into multiple sub-regions;
performing a binarization computation upon the shelf image so as to obtain a binarized image of every sub-region, in which the binarization computation is performed to compare a pixel gray value for each pixel of each of the sub-regions with a gray threshold;
computing a first binarization value ratio for a first sub-region and a second binarization value ratio for a second sub-region, wherein the first sub-region and the second sub-region are among the sub-regions;
obtaining a first binarization reference ratio of the first sub-region and a second binarization reference ratio of the second sub-region based on a shelf reference image that is another shelf image of an empty shelf and is captured by the image capture unit;
computing a first difference between the first binarization value ratio and the first binarization reference ratio of the first sub-region, so as to obtain a first stock decision parameter;
computing a second difference between the second binarization value ratio and the second binarization reference ratio of the second sub-region, so as to obtain a second stock decision parameter; and
estimating a stock level according to the first stock decision parameter and the second stock decision parameter.

11. The system as recited in claim 10, wherein the image capture unit further captures a second shelf image from another angle of light, the control unit performs the binarization computation on the second shelf image for obtaining a third binarization value ratio of a third sub-region, and a fourth binarization value ratio of a fourth sub-region, wherein the control unit compares the third binarization value ratio with a third binarization reference ratio to generate a third stock decision parameter, compares the fourth binarization value ratio with a fourth binarization reference ratio to generate a fourth stock decision parameter, and estimates the stock level according to the first stock decision parameter, the second stock decision parameter, the third stock decision parameter, and the fourth stock decision parameter.

12. The system as recited in claim 11, wherein the first sub-region and the third sub-region are the same, and the second sub-region and the fourth sub-region are the same.

13. The system as recited in claim 11, wherein the pixel with the pixel gray value smaller than the gray threshold is set to a first value, and the pixel with the pixel gray value larger than the gray threshold is set to a second value; and the binarization value ratio or the binarization reference ratio of every sub-region is calculated by dividing the number of the first value or the number of the second value by a pixel number of every sub-region.

14. The system as recited in claim 13 wherein the binarized image of the sub-region is composed of a number of black pixels and white pixels, and the binarization value ratio or the binarization reference ratio indicates a ratio of number of black pixels in the sub-region to the pixel number of the sub-region, or another ratio of number of white pixels in the sub-region to the pixel number of the sub-region.

15. The system as recited in claim 10, wherein the shelf image is obtained by using the image capture unit to capture image of the shelf when the shelf is illuminated by an infrared light; and the image capture unit includes a bandpass filter whose bandpass range and a wavelength range of the infrared light is 700 nm to 940 nm.

16. The system as recited in claim 10, wherein the multiple sub-regions of the shelf image are multiple parallel strip areas in one image.

17. The system as recited in claim 10, wherein the sub-regions respectively corresponding to the first stock decision parameter and the second stock decision parameter are continuous sub-regions.

18. The system as recite in claim 10, wherein the sub-regions respectively corresponding to the first stock decision parameter and the second stock decision parameter are discontinuous sub-regions.

19. The system as recited in claim 10, wherein the step for estimating the stock level using the stock decision parameters further comprises:
setting a decision threshold;
determining a starting point of items in stock on the shelf by a difference variation between the first stock decision parameter and the second stock decision parameter is larger than the decision threshold;
computing a ratio of the items placed in the sub-regions of the shelf according to the starting point of items in stock, and the ratio is rendered to estimate the stock level.

* * * * *